No. 667,684. Patented Feb. 12, 1901.
G. DEHARDE.
ANTIFRICTION BEARING.
(Application filed July 28, 1899.)
(No Model.)
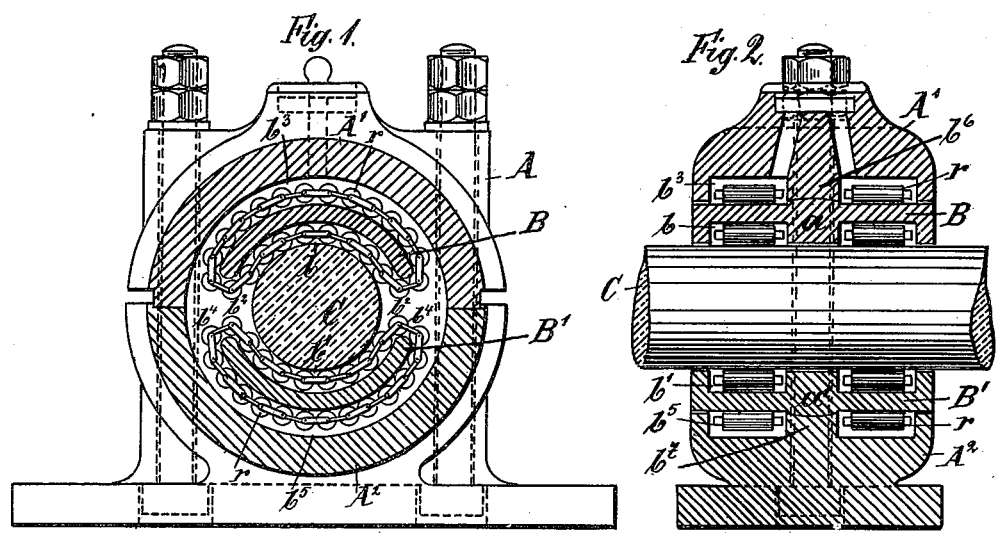
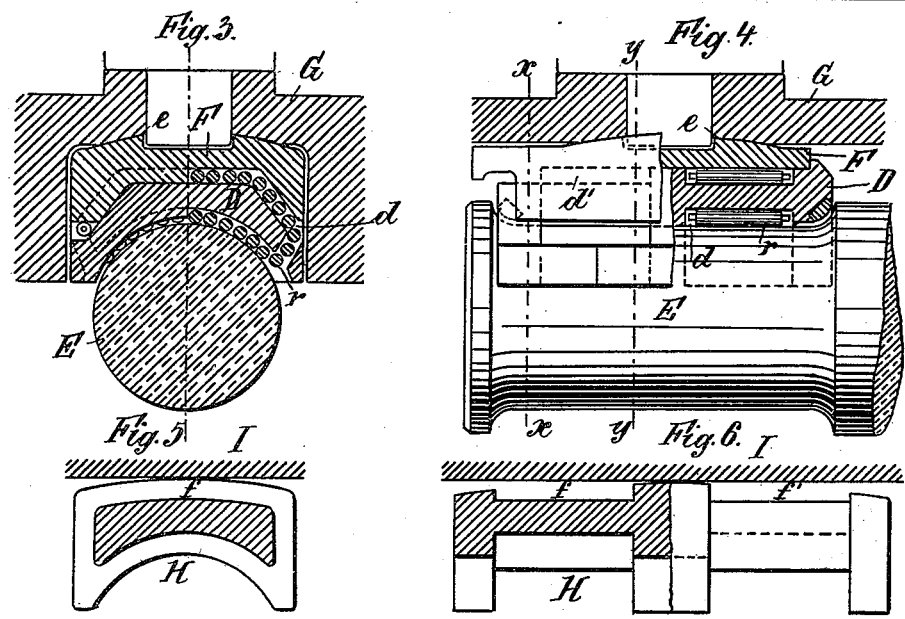
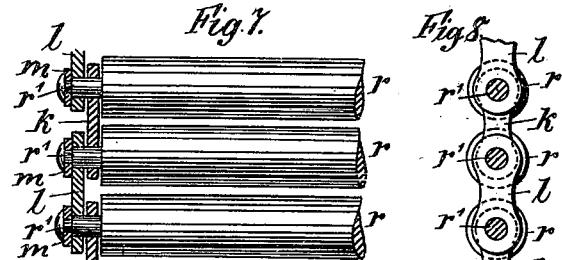
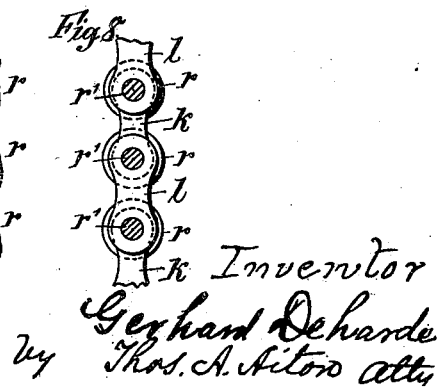
Attest.
Elsa Aiton
Maude E. Aiton
Inventor
Gerhard Deharde
by Thos. A. Aiton atty

UNITED STATES PATENT OFFICE.

GERHARD DEHARDE, OF WIESBADEN, GERMANY.

ANTIFRICTION-BEARING.

SPECIFICATION forming part of Letters Patent No. 667,684, dated February 12, 1901.

Application filed July 28, 1899. Serial No. 725,369. (No model.)

*To all whom it may concern:*

Be it known that I, GERHARD DEHARDE, a subject of the Emperor of Germany, residing at Wiesbaden, Empire of Germany, have invented a new and useful Improvement in Antifriction-Bearings, of which the following is a specification.

My invention relates to a new and improved antifrictional bearing, which is described in the following specification, of which latter the accompanying drawings form an inseparable part and have similar letters referring to similar parts.

In the drawings, Figure 1 is a sectional side view of a bearing embodying my invention. Fig. 2 is a cross-section of my new bearing when applied to stationary journals. Fig. 3 is a compound sectional view of a modified form of my invention as preferably applied to heavy cars, as railway-cars, &c., and shows on the left a section on line $x\,x$ of Fig. 4 and on the right a section on line $y\,y$ of the last-mentioned figure. Fig. 4 shows the modified form of Fig. 3 and is in part sectional. Figs. 5 and 6 show another modification, particularly adaptable when the bearing is used in street-cars, &c., and are side and front views, respectively, thereof. Figs. 7 and 8 clearly illustrate, on an enlarged scale, details of my invention.

Before describing my invention I would first call attention to those particular advantages which are embodied therein and hereinafter set forth. First, I provide an antifriction-bearing which by the nature of its simple construction is readily adaptable to any shaft or axle without any change therein and which owing to its cheap production can be in a moment replaced by another. In my invention it is unnecessary to make the rollers of any harder material than the axle itself, thereby reducing the cost of manufacture; second, by a novel construction I mount the said bearings so that they can readily follow any oscillating movement of the axle or shaft, and, thirdly, through a new device I connect the rollers in chains, which are themselves provided with antifrictional means, which arrangement gives the rollers through all parts of their movement an easy action, avoiding any jamming or driving, and reducing the frictional resistance to a minimum.

With the above advantages as the object of my invention I therefore construct a bearing-shell consisting in some instances, as in Fig. 1, of duplicate shell-sections B B', adapted to loosely fit about an axle or shaft C, and in a bearing-box A, which, as shown in Figs. 1 and 2, comprises a cover A' and footpiece A². On the inner faces of the said sections B B' are flanges $b\,b'$, concentric to the axle or shaft aforesaid and forming a concentrically-curved passage adjacent to the said shaft and through which passage travels an endless roller chain $r$. This chain, as will be seen from Figs. 7 and 8, is composed of a plurality of rollers $r$, made of any metal equaling in hardness the axle and shell aforesaid, eliminating thereby the present necessity of making such rollers from gun or other specially-prepared metals. These rollers have a diameter slightly exceeding the depth of the flanges aforesaid. Consequently when traveling through the said passages they extend slightly beyond these said flanges and act directly upon the shaft. However, as the shaft, &c., rotate it is quite obvious that the said chain is moved in addition to the rotation of its separate rollers, and since this is the case any means serving to assist the equal movement of the chain adds in obtaining easier running. I therefore form on each end of each of the rollers $r$ a pin $r'$. Connecting each pair of rollers is the small plate $k$, mounted at each end on the respective pins, while connecting the adjacent rollers of the successive pairs and also secured to the pins are links $l$, and on each pin adjacent to its head is a small disk $m$. The chain-roller moves, therefore, through the passage aforesaid and returns to the beginning-point through a second and connecting passage formed above the shell-section B (or below in shell-section B', as in the case in Figs. 1 and 2) by flanges $b^3$ in cover A', (or in shell-section B' by flanges $b^5$ in the foot A²,) and which latter passage slightly exceeds in depth the diameter of the rollers, thereby allowing free movement of the latter.

The central portions $a\,a'$ of the shell-sections B B' are adapted to bear against semispherical points $b^6$ and $b^7$, formed in cover A' and foot A² of casing A, through which all oscillating movement of the shaft or axle is responded to by the shell, insuring a uniform contact of the chain-rollers with the said shaft. However, in place of the construction shown in Figs. 1 and 2, which is preferably used for stationary and heavy shafting, I may employ modified forms, as shown in Figs. 3, 4, 5, and 6, and which are particularly adaptable for rail and street cars, respectively. Here, as illustrated in Figs. 3 and 4, I employ the single shell D, (corresponding to shell-section B or B',) and having formed therein two or more continuous passages, each concentrically arranged to the axle E and through each of which passes a chain-roller $r$, while a cap-piece F is provided with a recess in its upper portion, into which fits the semispherical bearing-point $e$, formed or fastened in the frame G, and through which latter the oscillating response of the shell is secured. The shell D on its inner or concave surface extends downwardly on each side of the axle to a predetermined point, as $d$.

In Figs. 5 and 6 I show the simplest form of my invention, in which the shell H, having the continuous passages therein, is also provided with the slightly-curved upper surface bearing direct against the frame I, and thereby giving the oscillating response to the shell of the axle while embodying the other essential features of my invention.

Having now described my invention, what I claim as new, and desire to protect by Letters Patent, is—

1. In an antifriction-bearing, the combination with a sectional shell adapted to loosely embrace a shaft or axle and having concentric flanges forming curved passages at different distances from the center, of endless roller chains, the rollers of which have a diameter exceeding the depth of said flanges and traveling in said passages, and means whereby oscillation of the shaft is responded to by the shell thus insuring uniform contact of the rollers with the shaft, substantially as shown and described.

2. The combination with the duplicate shell-sections having flanges on their inner faces forming concentrically-curved passages above and below the sections, of a box consisting of a cover and footpiece with semispherical points extending inwardly toward the center and bearing against the central portions of the shell-sections, and endless roller chains adapted to embrace the said sections and to travel in said passages and having rollers of diameters differing from the depth of the flanges, said rollers being connected by links and plates, all substantially as herein shown and described.

In testimony whereof I have hereunto set my hand, this 5th day of July, in the year 1899, in the presence of two witnesses.

GERHARD DEHARDE.

Witnesses:
SIMON W. HANAUER,
ALWIN VICTOR.